(12) United States Patent
Kondoh et al.

(10) Patent No.: US 6,528,444 B1
(45) Date of Patent: *Mar. 4, 2003

(54) GLASS COMPOSITION, STEM AND BULB FOR LAMPS

(75) Inventors: Toshifumi Kondoh, Osaka (JP); Yutaka Koyamada, Osaka (JP); Katsuaki Iwama, Osaka (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,595

(22) Filed: Feb. 8, 1999

(30) Foreign Application Priority Data

Feb. 10, 1998 (JP) .......................... 10-028747

(51) Int. Cl.⁷ ...................... C03C 3/087; C03C 3/091; H01J 13/24
(52) U.S. Cl. .................. 501/70; 501/66; 501/72; 313/493; 313/636
(58) Field of Search ............... 501/66, 70, 72; 313/493, 636

(56) References Cited

U.S. PATENT DOCUMENTS

| | | | | |
|---|---|---|---|---|
| 3,365,315 A | * | 1/1968 | Beck et al. | 501/70 |
| 4,179,638 A | * | 12/1979 | Boyd et al. | 501/70 |
| 4,309,507 A | * | 1/1982 | Davis et al. | 501/70 |
| 5,296,294 A | * | 3/1994 | Suzuki et al. | 501/70 |
| 5,470,805 A | | 11/1995 | Filmer | |
| 5,858,897 A | * | 1/1999 | Maeda et al. | 501/70 |
| 5,885,915 A | * | 3/1999 | Bako et al. | 501/66 |
| 5,925,583 A | * | 7/1999 | Yoshi et al. | 501/70 |
| 5,977,001 A | * | 11/1999 | Suha et al. | 501/66 |

FOREIGN PATENT DOCUMENTS

| | | | |
|---|---|---|---|
| DE | 31 35 910 | | 5/1982 |
| DE | 19731678 | * | 2/1998 |
| EP | 0 603 933 | | 6/1994 |
| EP | 616 984 | * | 9/1994 |
| EP | 822 169 | * | 2/1998 |
| JP | 49-006012 | * | 1/1974 |
| JP | 56-109836 | * | 8/1981 |
| JP | 59 107941 | | 6/1984 |
| JP | 2 033741 | | 2/1990 |
| JP | 2-252636 | * | 10/1990 |
| JP | 6-92677 | | 4/1994 |
| JP | 9-12332 | | 1/1997 |
| JP | 10-324540 | | 12/1998 |

OTHER PUBLICATIONS

Kummel U: "On the darkening of discharge tubes" Applied Physics, Jun. 1975, West Germany, vol. 7, No. 2, pp. 93–97.

* cited by examiner

*Primary Examiner*—David Sample
(74) *Attorney, Agent, or Firm*—Merchant & Gould P.C.

(57) ABSTRACT

For environmental protection, a glass composition for lamps that can suppress the consumption of mercury by the glass is provided. An embodiment of the glass composition consists essentially of, expressed in percentages by weight: $SiO_2$: 65–75, $Al_2O_3$: 0.5–4, $Na_2O$: 1–8, $K_2O$: 1–8, $Li_2O$: 0–2, $MgO$: 0.5–5, $CaO$: 1–8, $SrO$: 1–7, $BaO$: 3.5–7, $B_2O_3$: 0–3, $Sb_2O_3$: 0–1, $Fe_2O_3$: 0–0.2, $TiO_2$: 0–1, $CeO_2$: 0–1; and the total amount of $Na_2O$, $K_2O$ and $Li_2O$ is not more than 13 weight %. The glass composition is substantially free of lead.

6 Claims, 1 Drawing Sheet

GLASS COMPOSITION, STEM AND BULB FOR LAMPS

BACKGROUND OF THE INVENTION

1. Field of the Invention

The present invention relates to a glass composition for various kinds of lamps such as a fluorescent lamp and an incandescent lamp, and a stem and a bulb for lamps that include the glass composition.

2. Description of the Prior Art

A glass composition for lamps is roughly divided into two groups. One is for stems including an exhaust tube and a flared base, and the other is for bulbs such as a luminescent bulb. In general, lead glass comprising 4 to 28 wt % of lead has been used for stems because it is handled easily in a forming process while heating. The glass bulb has been formed of a soda-lime silicate glass comprising 10 to 20 wt % of sodium oxide or about the same lead glass as for stems.

For environmental protection, cutting back on environmentally harmful materials is desired. In the field of lighting, problematic contaminants are lead and mercury. Lead is included in the glass for stems and bulbs. Therefore, some lead-free glass compositions have been proposed.

Tokkai-Hei 6-206737 discloses a glass composition free of PbO as well as toxic F, $Sb_2O_3$ and $As_2O_3$. The glass composition disclosed specifically, expressed in wt %, is e.g. $SiO_2$: 68.0, $Al_2O_3$: 3.4, $Li_2O$: 1.2, $Na_2O$: 7.4, $K_2O$: 5.0, BaO: 8.7, SrO: 2.9, MgO:1.3, CaO: 1.9 and $SO_2$: 0.1.

Tokkai-Hei 9-12332 also discloses a glass composition free of PbO. In the glass composition, BaO is reduced because BaO tends to cause opacity of glass for stems, especially when used in a Danner method. The glass composition contains 0.3 to 3.5 wt % of BaO, and alkali metal oxides $R_2O$ (R=Li, Na, K) than alkaline earth metal oxides R'O (R'=Mg, Ca, Sr, Ba) so as to keep shape-formability. The glass compositions disclosed specifically contains 15.5 to 16.0 wt % of $R_2O$.

Tokkai-Hei 6-92677 also discloses a glass composition free of PbO. In the glass composition, $TiO_2$ and $CeO_2$ improve the solarization-resistant property and $Fe_2O_3$ increases the absorption of ultraviolet rays. In this glass composition, a predetermined amount of alkali metal oxide is considered necessary so as to suppress a rise of the softening point of the glass. The glass composition disclosed specifically contains at least about 15 wt % of $R_2O$.

The glass compositions as described above can truly provide lead-free glass for lamps, but are not designed to reduce another environmentally affective material, mercury. At the present time, mercury is sealed into fluorescent lamps in more than a theoretically necessary amount for lighting because there is a necessity to consider the consumption of mercury by the glass while lighting.

SUMMARY OF THE INVENTION

Therefore, it is an object of the present invention to provide a glass composition for lamps that is substantially free of lead and can reduce mercury consumption, and a stem and a bulb for lamps that can meet the need of environmental protection.

An embodiment of the glass composition for lamps of the present invention consists essentially of the following constituents, expressed in percentages by weight:

| | |
|---|---|
| $SiO_2$ | 65–75, |
| $Al_2O_3$ | 0.5–4, |
| $Na_2O$ | 1–8, |
| $K_2O$ | 1–8, |
| $Li_2O$ | 0–2, |
| MgO | 0.5–5, |
| CaO | 1–8, |
| SrO | 1–7, |
| BaO | 3.5–7, |
| $B_2O_3$ | 0–3, |
| $Sb_2O_3$ | 0–1, |
| $Fe_2O_3$ | 0–0.2, |
| $TiO_2$ | 0–1, |
| $CeO_2$ | 0–1; | and the total amount of $Na_2O$, $K_2O$ and $Li_2O$ is not more than 13 weight %.

The glass composition provides glass for lamps that is substantially free of lead and has an advantage of suppressing the consumption of mercury in the lamps. In lighting, alkali ions such as sodium ions in the glass tend to diffuse, especially to move toward the inside of the bulb. Moving alkali ions facilitate the reaction of the alkali ions with mercury vapor and the fixation of mercury into the voids of the alkali ions. Mercury trapped in the voids no longer contributes to the electric discharge of the lamp. The glass composition of the present invention contains less $R_2O$ (R=Li, Na, K) than conventional glass compositions. In addition, the glass composition contains diffusion inhibitors for alkali ions, e.g. BaO, in such an extent that the glass can be smoothly formed into a predetermined shape. Therefore, the glass composition can reduce the consumption of mercury.

Another embodiment of the glass composition for lamps of the present invention consists essentially of the following constituents, expressed in percentages by weight:

| | |
|---|---|
| $SiO_2$ | 65–75, |
| $Al_2O_3$ | 0.5–4, |
| $Na_2O$ | 1–7, |
| $K_2O$ | 1–8, |
| $Li_2O$ | 0–2, |
| MgO | 0.5–5, |
| CaO | 1–8, |
| SrO | 1–7, |
| BaO | 4–6.5, |
| $B_2O_3$ | 0–3, |
| $Sb_2O_3$ | 0–1, |
| $Fe_2O_3$ | 0–0.2, |
| $TiO_2$ | 0–1, |
| $CeO_2$ | 0–1. |

The glass composition also provides glass for lamps that is substantially free of lead and has an advantage of suppressing the consumption of mercury in the lamps. In particular, sodium oxide, which is considered to easily form an amalgam with mercury, is included in not more than 7 wt %. In this composition, the total amount of $Na_2O$, $K_2O$ and $Li_2O$ is preferably not more than 13 wt %.

In one embodiment of the glass composition of the present invention, the total amount of $Na_2O$, $K_2O$ and $Li_2O$ is preferably not more than the total amount of MgO, CaO, SrO and BaO.

The glass composition of the present invention is preferable in terms of environmental protection. The glass composition is determined by taking shape-formability in heating and other properties into consideration.

An embodiment of the stem and the bulb of the present invention includes glass having the glass composition of the present invention as described above. Thus, lamps that can meet the need of environmental protection are provided.

DESCRIPTION OF THE PREFERRED EMBODIMENTS

Figure 1:
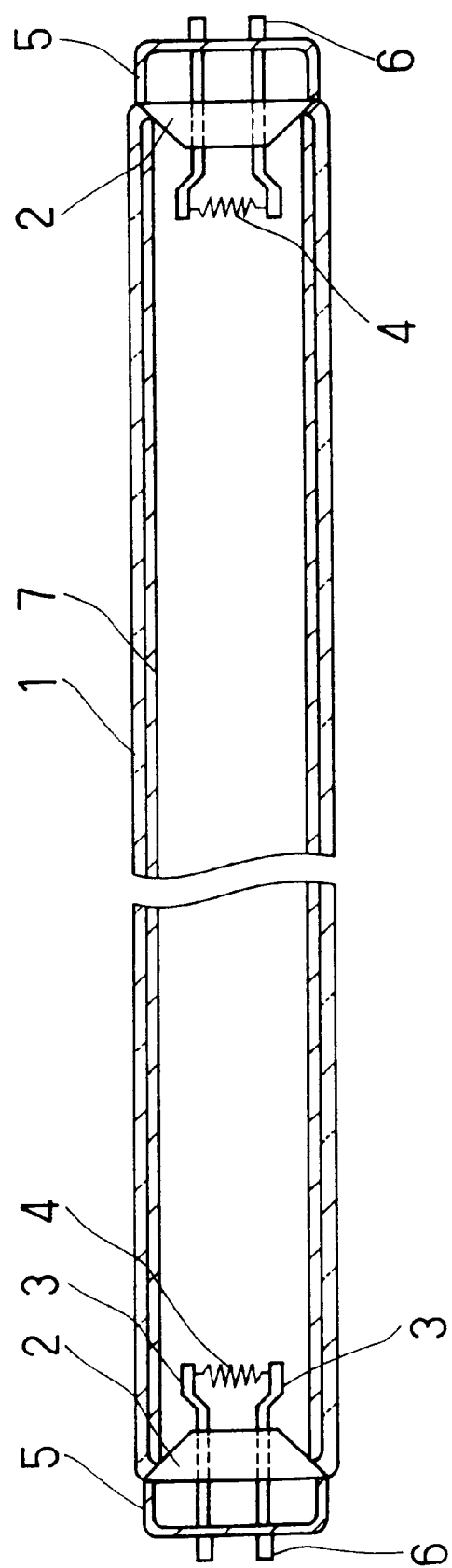
FIG. 1 is a longitudinal-sectional view of a fluorescent lamp including a bulb and stems having a glass composition of the present invention.

An embodiment of the glass composition includes $SiO_2$, $Al_2O_3$, $Na_2O$, $K_2O$, MgO, CaO, SrO and BaO as indispensable constituents and $Li_2O$, $B_2O_3$, $Sb_2O_3$, $Fe_2O_3$, $TiO_2$ and $CeO_2$ as dispensable constituents. Hereinafter, these constituents will be described.

$SiO_2$ is an essential component for formation of the glass. When $SiO_2$ is contained in an amount of less than 65 wt %, the expansion coefficient becomes excessively high and chemical resistance deteriorates. When it exceeds 75 wt %, the expansion coefficient becomes excessively low, and shape forming becomes difficult because of its excessively high softening point.

An $Al_2O_3$ content less than 0.5 wt % degrades the chemical resistance, and an $Al_2O_3$ content more than 4 wt % results in an inhomogeneous glass and more striae.

$Na_2O$ and $K_2O$, alkali metal oxides, are used to reduce the viscosity of the glass and improve the shape-forming property in heating. When the two oxides are included in the range as described above, a sufficiently high electrical resistance can be obtained due to the mixed alkali effect. However, an excess amount of the alkali metal oxides, especially $Na_2O$, makes it difficult to reduce the consumption of mercury. Viewed in this light, each content of $Na_2O$ and $K_2O$ is preferably 1 to 7 wt %.

MgO and CaO, alkaline-earth metal oxides, improve the electric insulation and the chemical resistance. However, a MgO content of less than 0.5 wt % or a CaO content of less than 1 wt % fails to provide these advantages. A MgO content of more than 5 wt % or a CaO content of more than 8 wt % is not preferable because the glass may become opaque.

SrO improves the hardness and the chemical resistance of the glass. However, a SrO content of less than 1 wt % fails to provide these advantages. A SrO content of more than 7 wt % increases the opacity. The SrO content is preferably in the range from 2.5 to 7 wt %. BaO serves to lower the softening point and raise the electric resistance. A BaO content of less than 3.5 wt % fails to provide this advantage. A BaO content of more than 7 wt % increases the opacity. The BaO content is preferably in the range from 4 to 6.5 wt %. SrO and BaO are excellent diffusion inhibitors of alkali ions.

A $Li_2O$ content not more than 2 wt % is preferable. $Li_2O$ is superior to $Na_2O$ and $K_2O$ in reducing the viscosity of glass and improving a shape-forming property. $Li_2O$ enhances the mixed alkali effect. However, an excess amount of $Li_2O$ causes an overly high expansion coefficient.

A $B_2O_3$ content not more than 3 wt % is preferable. $B_2O_3$ increases the strength and the durability of the glass, and reduces the opacity. A $B_2O_3$ content of more than 3 wt % is not preferable because the expansion coefficient becomes too small.

A $Sb_2O_3$ content not more than 1 wt % is preferable. $Sb_2O_3$ works as a clarifier of the glass. A $Sb_2O_3$ content of more than 2 wt % is not preferable because re-foaming or blackening may occur during a heating process.

A $Fe_2O_3$ content not more than 0.2 wt % is preferable. $Fe_2O_3$ has a property of absorbing ultraviolet rays, and serves to suppress the radiation of ultraviolet rays from the fluorescent lamp. A $Fe_2O_3$ content of more than 0.2 wt % is not preferable because the light transmissivity in a visible range of the glass drops to lower a luminous flux of the lamp.

A $TiO_2$ content and a $CeO_2$ content not more than 1 wt % are preferable. These constituents suppress the solarization of the glass caused by ultraviolet rays. Adding more than 1 wt % of the constituents hardly enhances the solarization-resistance.

The total amount of the alkali oxides $R_2O$ is preferably not more than the total amount of the alkaline earth metal oxides R'O that suppress the diffusion of the alkali metal, because mercury consumption can be reduced more effectively.

A preferable glass composition as described above does not contain lead, but has the same shape-formability in heating as conventional lead glass compositions. Therefore, by the previously known methods, various kinds of stems and bulbs for lamps such as an arc tube for mercury vapor-filled discharge lamps can be formed with the glass.

A straight tube fluorescent lamp shown in FIG. 1 is an embodiment of the lamps including the glass composition of the present invention. As shown in FIG. 1, stems (flared stems) 2 are attached to both of the ends of a glass bulb 1 so as to seal it. A pair of lead wires 3 goes through each of the stems 2 while keeping the airtightness in the glass bulb. A filament coil 4 coated with an emissive substance is laid so as to connect the end portions of the lead wires 3. Bases 5 are fixed in the ends of the glass bulb 1, and base pins 6 in connection with the lead wires 3 are attached to the base 5. A fluorescent-substance layer 7 is formed on the inside surface of the glass bulb 1, and a predetermined amount of mercury and rare gas such as argon is sealed in the glass bulb 1.

EXAMPLES

Hereinafter, the present invention will be described by way of examples.

Table 1 shows glass composition Examples of the present invention and glass composition Comparative Examples. A glass composition in Comparative Example 1 is an example of soda-lime glass used for bulbs of fluorescent lamps. Comparative Example 2 shows an example of lead glass used mainly for stems of lamps.

Raw materials prepared so as to have each composition in Table 1 were melted in platinum crucibles in an electric furnace. The melting material was spread on a carbon plate to obtain glass samples, followed by annealing them.

TABLE 1

|  | Example | | | | | | | Comparative Example | |
|---|---|---|---|---|---|---|---|---|---|
|  | 1 | 2 | 3 | 4 | 5 | 6 | 7 | 1 | 2 |
| Glass composition wt % | | | | | | | | | |
| $SiO_2$ | 70.0 | 68.0 | 72.0 | 69.0 | 70.0 | 70.5 | 71.0 | 72.0 | 58.5 |
| $Al_2O_3$ | 2.0 | 1.5 | 1.0 | 3.5 | 2.5 | 2.5 | 1.5 | 1.7 | 1.0 |
| $Na_2O$ | 7.0 | 5.0 | 4.0 | 6.0 | 4.0 | 3.0 | 5.5 | 16.4 | 8.3 |
| $K_2O$ | 6.0 | 7.0 | 5.0 | 2.0 | 6.0 | 7.0 | 4.0 | 1.1 | 4.0 |
| MgO | 1.5 | 2.0 | 1.0 | 3.0 | 4.0 | 3.0 | 1.0 | 2.7 |  |
| CaO | 2.0 | 4.5 | 2.5 | 6.0 | 3.0 | 1.5 | 3.0 | 5.6 |  |
| SrO | 6.0 | 5.0 | 7.0 | 2.5 | 4.0 | 4.0 | 6.0 |  |  |
| BaO | 5.5 | 6.0 | 4.0 | 6.5 | 5.0 | 6.5 | 6.0 |  | 0.5 |
| $Li_2O$ |  | 1.0 | 1.5 |  | 1.4 | 0.5 |  |  |  |
| $B_2O_3$ |  |  | 2.0 | 1.0 |  | 1.0 | 1.0 |  |  |
| $Sb_2O_3$ |  |  |  | 0.5 |  |  | 0.5 | 0.5 | 0.2 |
| $Fe_2O_3$ |  |  |  |  | 0.1 |  |  |  |  |
| $TiO_2$ |  |  |  |  |  | 0.5 |  |  |  |
| $CeO_2$ |  |  |  |  |  |  | 0.5 |  |  |
| PbO |  |  |  |  |  |  |  |  | 27.5 |
| Linear Expansion Coefficient [$\times 10^{-7}/°$ C.] | 94.5 | 94.8 | 94.0 | 93.5 | 95.0 | 94.0 | 94.0 | 99.0 | 94.0 |
| Softening Point [° C.] | 680 | 665 | 685 | 670 | 675 | 685 | 680 | 690 | 615 |
| Operation Temperature [° C.] | 990 | 985 | 995 | 990 | 995 | 990 | 985 | 1005 | 955 |
| Eluted Amount of Alkali [mg] | 0.4 | 0.3 | 0.4 | 0.5 | 0.4 | 0.3 | 0.5 | 0.8 | 0.7 |

The linear expansion coefficient is an average expansion coefficient between 0 to 300° C., and a value obtained by a measurement according to "a test method for the average expansion coefficient of glass" in Japanese Industrial Standards R 3102. The softening point is a value obtained by a measurement according to "a test method for the softening point of glass" in Japanese Industrial Standards R 3104. The operation temperature is a temperature corresponding to a viscosity of $10^3 Pa·s$, which is determined from a viscosity curve measured at a high temperature. The eluted amount of alkali is a value obtained by a measurement according to Japanese Industrial Standards R 3502.

As shown in Table 1, the glass compositions in the examples have sufficient properties to use them for glass for lamps, especially for stems and bulbs. With the glass composition of Examples 1 to 7, stems (100 pieces per composition) for a 40 W straight-tube fluorescent lamp were formed. The glass compositions did not cause any problems in shape-forming, and the glass strength and the sealing property with lead wires of a dumet (Dumet wires) also were satisfactory.

With stems and bulbs having the glass composition of Examples 1, 4 and 7 and Comparative Example 1, 50 pieces of 40 W straight-tube fluorescent lamps were prepared. The glass compositions caused no problems in manufacturing.

Initial luminous flux, its maintaining ratio and a mercury consumption amount were measured. For the measurement, five lamps per glass composition were used.

TABLE 2

|  |  | Example | | | Com. Example |
|---|---|---|---|---|---|
|  |  | 1 | 4 | 7 | 1 |
| Initial Luminous Flux [lm] | | 3480 | 3480 | 3460 | 3450 |
| Life test (1000 hrs) | Luminous Flux Maintaining Ratio [%] | 97.0 | 97.0 | 97.5 | 96.0 |
| | Mercury Consumption Amount [mg] | 0.4 | 0.5 | 0.5 | 0.7 |

The luminous flux maintaining ratio in Table 2 refers to a ratio of a luminous flux at the point after 1000 hours of life test to a luminous flux at the point after 100 hours of life test.

The mercury consumption amount is measured in a chamber with a heater, an evacuator and a quadrupole mass spectrometer. In this chamber, after breaking a lamp, the chamber is evacuated at 40° C. until no mercury is detected. Then, the chamber is heated and kept at 450° C. until no mercury is detected. The mercury consumption amount is calculated based on the total amount of mercury detected from the chamber.

As seen in Table 2, the mercury consumption amounts in the lamps of Examples 1, 4 and 7 of the present invention are less than the amount in the conventional lamp of Comparative Example 1. In addition, the lamps of the Examples have performance higher than the conventional lamps in the initial luminous flux and the luminous maintaining ratio.

Basically, the glass composition is free of lead, and has a good shape-formability in heating and chemical resistance enough to use for lamps, so the glass composition can be utilized for other lumps such as a light bulb, not to mention other types of fluorescent lamps such as a compact-type fluorescent lamp.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A stem for lamps including glass which has a composition consisting essentially of, expressed in percentages by weight:

$SiO_2$ 65–75,
$Al_2O_3$ 0.5–4,
$Na_2O$ 1–7,
$K_2O$ 1–7,
$Li_2O$ 0–2,
MgO 0.5–5,
CaO 1–8,
SrO 2.5–7,
BaO 4–6.5,
$B_2O_3$ 0–3,
$Sb_2O_3$ 0–1,
$Fe_2O_3$ 0–0.2,
$TiO_2$ 0–1,
$CeO_2$ 0–1;

wherein the total amount of $Na_2O$, $K_2O$ and $Li_2O$ is not more than 13%.

2. A stem according to claim 1, wherein the composition is substantially free of lead.

3. A stem for lamps according to claim 1, wherein the total amount of $Na_2O$, $K_2O$ and $Li_2O$ is not more than the total amount of MgO, CaO, SrO and BaO.

4. A bulb for lamps including glass which has a composition consisting essentially of, expressed in percentages by weight:

$SiO_2$ 65–75,
$Al_2O_3$ 0.5–4,
$Na_2O$ 1–7,
$K_2O$ 1–7,
$Li_2O$ 0–2,
MgO 0.5–5,
CaO 1–8,
SrO 2.5–7,
BaO 4–6.5,
$B_2O_3$ 0–3,
$Sb_2O_3$ 0–1,
$Fe_2O_3$ 0–0.2,
$TiO_2$ 0–1,
$CeO_2$ 0–1;

wherein the total amount of $Na_2O$, $K_2O$ and $Li_2O$ is not more than 13%.

5. A bulb according to claim 4, wherein the composition is substantially free of lead.

6. A bulb for lamps according to claim 4, wherein the total amount of $Na_2O$, $K_2O$ and $Li_2O$ is not more than the total amount of MgO, CaO, SrO and BaO.

* * * * *